US008820525B1

(12) United States Patent
Zanxiang (10) Patent No.: US 8,820,525 B1
(45) Date of Patent: Sep. 2, 2014

(54) PROTECTIVE CASE WITH BRACKET FOR DIGITAL PRODUCTS

(71) Applicant: Li Zanxiang, Shenzhen (CN)

(72) Inventor: Li Zanxiang, Shenzhen (CN)

( * ) Notice: Subject to any disclaimer, the term of this patent is extended or adjusted under 35 U.S.C. 154(b) by 0 days.

(21) Appl. No.: 14/016,591

(22) Filed: Sep. 3, 2013

(51) Int. Cl.
*B65D 85/00* (2006.01)
*B65D 5/52* (2006.01)
*H05K 5/00* (2006.01)

(52) U.S. Cl.
CPC .................................. *H05K 5/0086* (2013.01)
USPC ....................................... 206/320; 206/45.24

(58) Field of Classification Search
USPC ............................ 206/45.24, 45.26, 305, 320; 361/679.01, 679.02, 679.05, 679.55, 361/679.56, 679.59; 455/575.1, 575.4, 455/575.8
See application file for complete search history.

(56) References Cited

U.S. PATENT DOCUMENTS

| | | | | |
|---|---|---|---|---|
| 930,338 | A * | 8/1909 | Benjamin | 206/45.24 |
| 2,444,369 | A * | 6/1948 | Rentos Costas | 206/45.24 |
| 8,132,670 | B1 * | 3/2012 | Chen | 206/320 |
| 8,173,893 | B2 * | 5/2012 | Huang | 206/320 |
| 8,522,965 | B1 * | 9/2013 | Hsiung | 206/45.24 |
| 2011/0038119 | A1 * | 2/2011 | Yeh | 361/679.55 |
| 2013/0313142 | A1 * | 11/2013 | Wen | 206/320 |
| 2014/0029197 | A1 * | 1/2014 | Hishinuma | 361/679.55 |

* cited by examiner

*Primary Examiner* — Luan K Bui
(74) *Attorney, Agent, or Firm* — Greg M. Popowitz; Assouline & Berlowe, P.A.

(57) ABSTRACT

Protective case with bracket mechanism for digital products, including protective sleeve body, fixed member arranged on bracket mechanism on back face of protective sleeve body, bracket mechanism includes fixed member, cushion member and support member, where fixed member is fixedly connected on back face of sleeve body, and, fixed member includes plurality of locking parts. Bottom of cushion member pivots in pivoting groove at bottom of fixed member, bottom of support member pivots about upper portion of cushion member, which is arranged on fixed member, cushion member and support member arranged within fixed member when bracket mechanism closes, and, to open bracket mechanism, bottom portion of the cushion member extends outward by pivoting about pivoting grove of fixed member, and upper portion of support member pivots and slides about track grooves in fixed member, where upper portion of support member is securely locked into one of plurality of locking parts.

5 Claims, 7 Drawing Sheets

PROTECTIVE CASE WITH BRACKET FOR DIGITAL PRODUCTS

CROSS-REFERENCE TO RELATED APPLICATIONS

This patent application claims the benefit under 35 U.S.C. §119(a) of Chinese Patent Application No. 201320273841.0, filed May 17, 2013, which application is incorporated herein by reference.

FIELD OF THE INVENTION

The invention broadly relates to a protective case, more specifically to a protective case with a bracket, and even more particularly to a protective case with a bracket for digital products.

BACKGROUND OF THE INVENTION

As can be derived from the variety of devices and methods directed at protective cases, many means have been contemplated to accomplish the desired end, i.e., protecting digital products. The outer protective portion of display devices in the current market, especially for thin products, such as: computer bags, mobile phones and notebook computer liners, to name a few, provide minimal protection. While in use, the position of the user varies, thereby causing the user to adjust the device to different angles. Heretofore, existing protective devices have not adequately provided the user with the necessary options to properly display devices at user defined angles. In addition, existing devices that provide limited adjustability create complexity that does not allow for convenient use and comfortable carrying by the user. Thus, there is a long-felt need for a protective case with a bracket mechanism for digital products.

BRIEF SUMMARY OF THE INVENTION

The present invention broadly comprises a protective case with a bracket for digital products, including a bracket mechanism fixedly connected to the back cover of the protective case, the bracket mechanism including a fixed member, a cushion member part, and a support member.

The fixed member is affixed to the back of the protective sleeve body, the support member is provided with at least a clamping part; the cushion member end is pivoted on the fixed end; the lower end of the support member is pivoted to the upper end of the cushion member. The upper portion of the support member is arranged on the fixed member. When the bracket closes, the support and cushion elements are arranged substantially flat against the fixed member. When the bracket is opened, the upper end of the cushion member and the lower end of the support member shift out from the closed position; the upper end of the support member slides along the grooves in the fixed element and the upper end of the support member can be pushed to the stop to lock the bracket open.

The fixed member has a flat area near the protective sleeve body periphery and is formed with a side wall, the side wall and a containing space, the side wall at the bottom end of the inner side of the lower end is provided with an outward pin joint groove, the cushion member base has a plate shape and form from the base end extending up both sides of the lower end of the base, and an extension part respectively provided with a convex pivot column, the base of both sides of the lower end of the pivot column pivots about the pivoting groove.

The middle wall of the sides are respectively provided with rail grooves, the groove is arranged on the side wall of the upper track, the support member has a main part and a lower part respectively from both sides of the fixed member extending downward to form a pivoting arm, both sides of the upper end of the support member respectively and convexly provided with pivot column, the pivot column part containing slides in the track groove, pivoted arm is provided with a horizontal pivoted arm pivot hole, and pad extensions on both sides of the pivot column pivoted on the pivot hole.

The protective sleeve body used for holding the digital products is provided with an accommodating groove. The protective sleeve body back face is provided with an accommodating slot, the fixed piece is fixed arranged on the cover body on the back of the accommodating groove.

The fixed member includes a plurality of longitudinally arranged windows. The window edge extends at an incline to form the locking part, and the clamping part extends into the containing space.

With the support of digital products covered when in use, the support and cushion members can be accommodated in the closed bracket position, or flat against the fixed member, which is convenient for carrying and storage. For the open bracket position, the cushion and support members pivot away from the fixed member. The upper portion of the support member slides in the grooves of the fixed member and can be pushed to lock in place, which can support digital products in various uses for more comfortable and easier use.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "cover" is synonymous with terms such as "case", "holder", "jacket", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
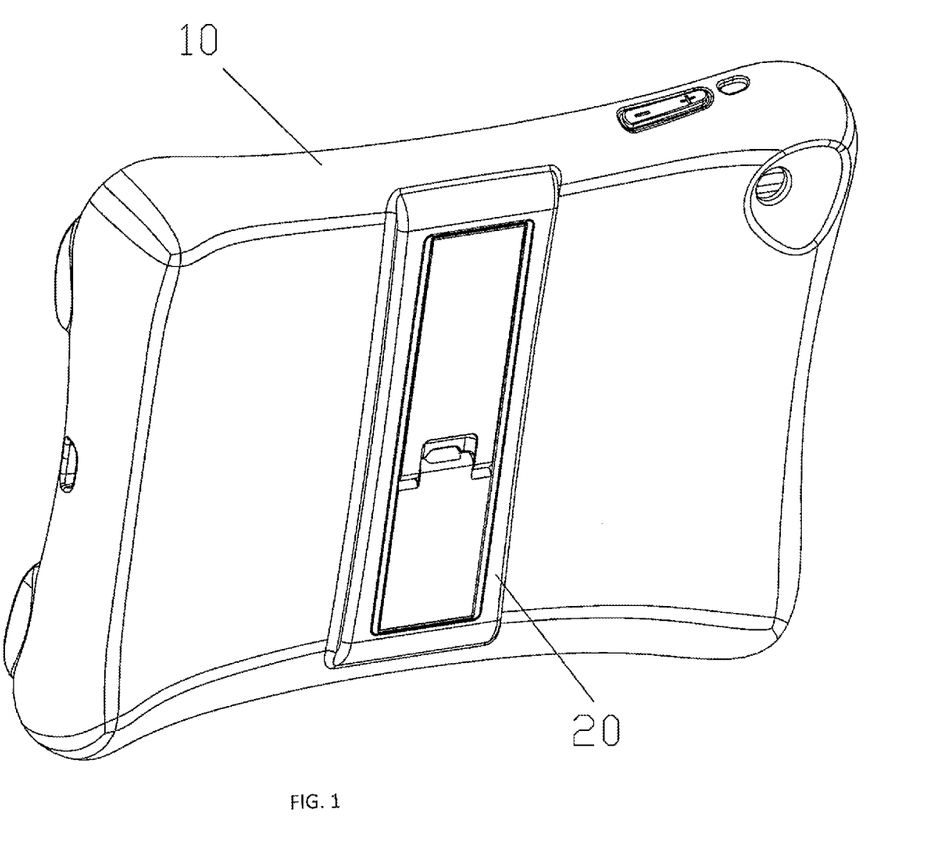
FIG. 1 is a rear perspective view of the protective sleeve with the bracket in a closed position.
Figure 2:
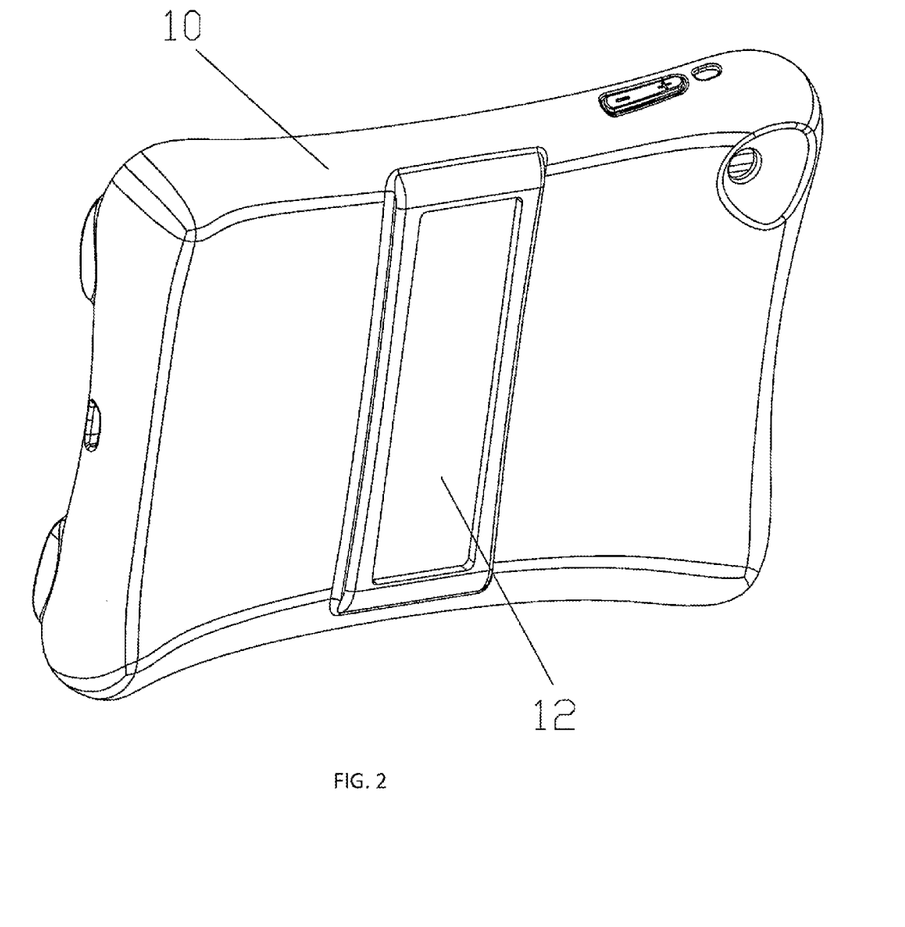
FIG. 2 is a rear perspective view of the protective sleeve showing the frame without the movable bracket.
Figure 3:
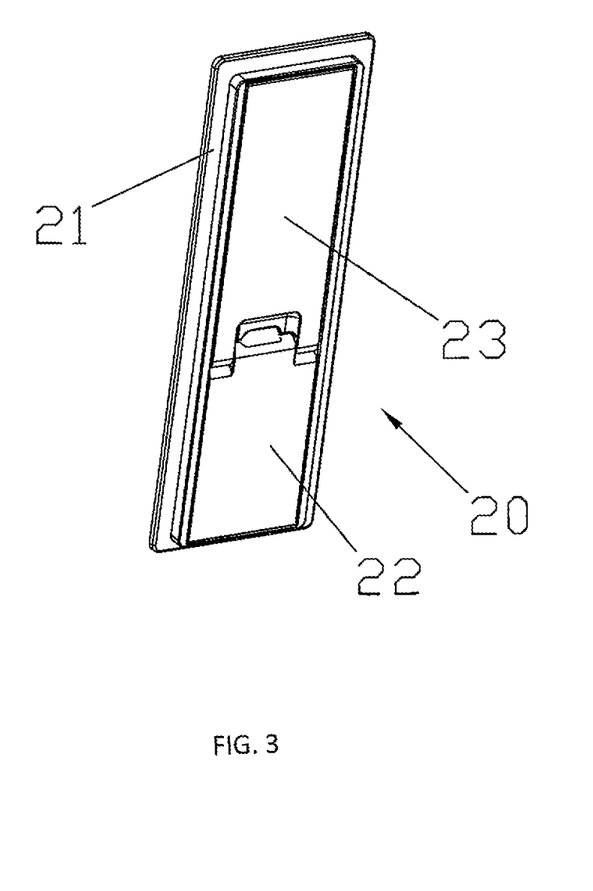
FIG. 3 is a perspective view of the movable bracket.
Figure 4:
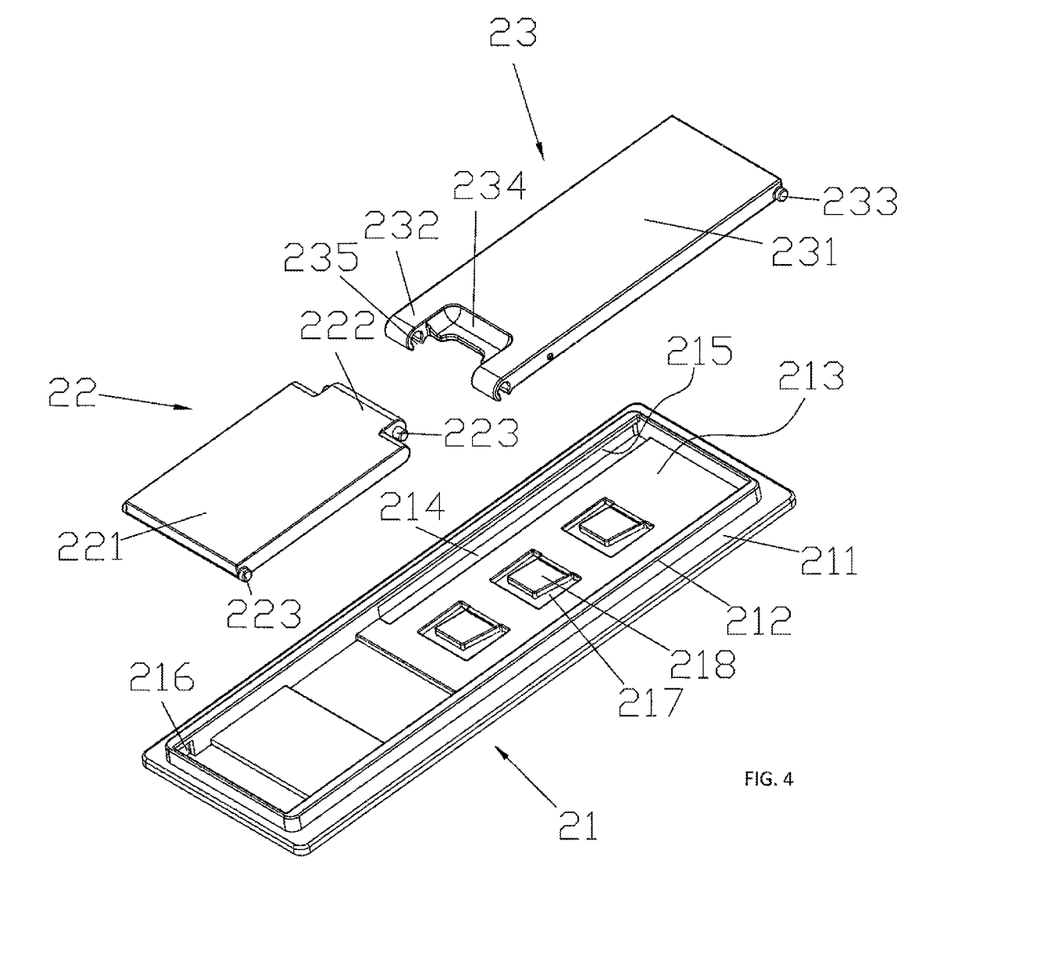
FIG. 4 is a top exploded view of the bracket components.
Figure 5:
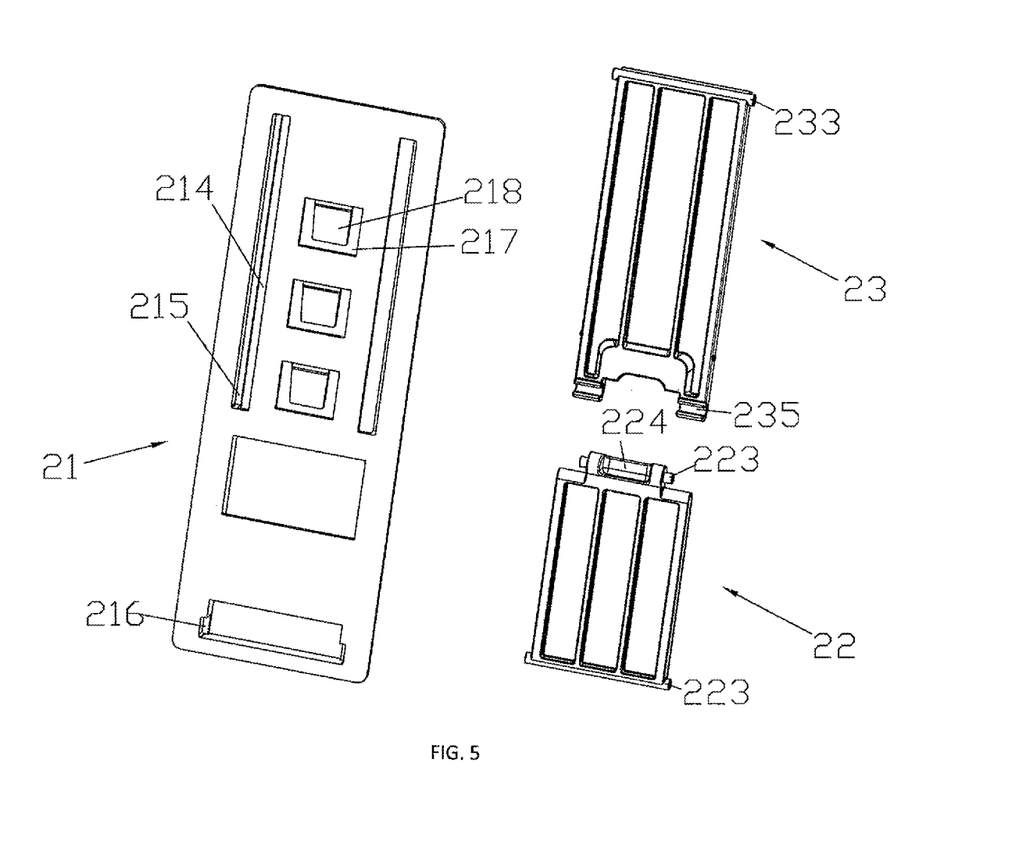
FIG. 5 is a bottom exploded view of the bracket components.

Adverting now to the figures, FIGS. 1 and 2 show a digital product protective sleeve that is applied to digital products, such as, but not limited to, flat-panel computers and smart mobile phones. The preferred embodiment of the support mechanism of the protective sleeve includes protective sleeve body 10 and is fixedly arranged on the back of bracket mechanism 20. Bracket mechanism 20 includes fixed member 21, cushion member 22, and support member 23.

FIGS. 1 and 2 illustrate protective sleeve body 10 with containing grooves 11, used for holding the digital products, where protective sleeve body 10 is provided with accommodating groove 12 on the rear face of the protective sleeve body.

Referring to FIG. 2 through FIG. 5, fixed member 21 is fixedly arranged on protective sleeve body 10 on the back of accommodating groove 12, fixed member 21 is provided with at least one locking part 218. In particular, fixed member 21 with planar board 211, close to the main planar board 211, is formed around side wall 212. Side wall 212 forms containing space 213. Planar board 211 is arranged at both sides of the upper and lower extension near slot 214. Side wall 212 extends longitudinally with slots 214 communicating with respective track grooves 215. Track grooves 215 are located on the inner portion of the upper portion of side wall 212. The lower portion of side wall 212 includes pivoting groove 216, which allows for outward pivoting.

The middle of board 211 includes a plurality of longitudinally arranged windows 217. The edges of windows 217 extend obliquely from the formation of locking part 218. Locking part 218 extends into the containing space within window 217, which, in the preferred embodiment, has a three locking parts 218. In an example embodiment, the support mechanism is made from a plastic material, thereby providing elasticity to locking part 218, and, by extrusion, can retract to the plane of window 217.

Cushion member 22 is pivoted on fixing member 21. In particular, cushion member 22 includes panel 221, or base, which extends upward to form protrusion extension portion 222. Extension portion 222 is narrower than the sides of panel 221. A plurality of cushion pivot columns 223 protrude from the bottom sides of panel 221 and from the sides of extension portion 222, respectively. The edge of extension portion 222 forms a rounded profile that interacts with cushion pivot columns 223. Cushion pivot columns 223 of the lower portion of panel 221 pivot in pivoting groove 216. The inner side of extension portion 222 of panel 221 includes extension groove 224, arranged for manual movement of bracket mechanism 20 about extension groove 224 to open and close the bracket mechanism.

Support member 23 pivots on the pad at the top of upper cushion member 22, which is arranged on fixed member 21. Specifically, support member 23 includes panel board 231. Panel board 231 lowers from both sides of fixed member 21, respectively, extending downward by pivoting about pivoting arm 232, which extends from panel board 231. The top of panel board 231 slides using support pivot columns 233, respectively, with a convex profile. Support pivot columns 233 are located and slide in track grooves 215. The bottom portion of panel board 231 includes a concave formation, or relief groove 234. Pivoted arms 232 include horizontal pivot holes 235. To join cushion member 22 with support member 23, cushion pivot columns 223 on extension portion 222 insert into pivot holes 235 on pivoting arm 232.

The preferred embodiment of the present invention is a protective sleeve assembly with a bracket for a digital product. Cushion pivot columns 223 of the sides of the lower end of panel 221 of cushion member 22 pivots within pivoting grooves 216 of fixed member 21. The lower portion of cushion member 22 pivots about cushion pivot columns 223 on both sides of cushion member 221. The upper portion of cushion member 22 pivots about cushion pivot columns 223 that are connected to horizontal pivot holes 235 of support member 23. Support pivot columns 233 located on support member 23 slide in track grooves 215 of fixed member 21. In the open position, bracket mechanism 20, which includes cushion member 22 and support member 23, protrudes from fixed member 21. In the closed position, bracket mechanism 20, which includes cushion member 22 and support member 23, lay flat within fixed member 21 and substantially parallel to accommodating groove 12 next to protecting sleeve body 10.

Figure 6:
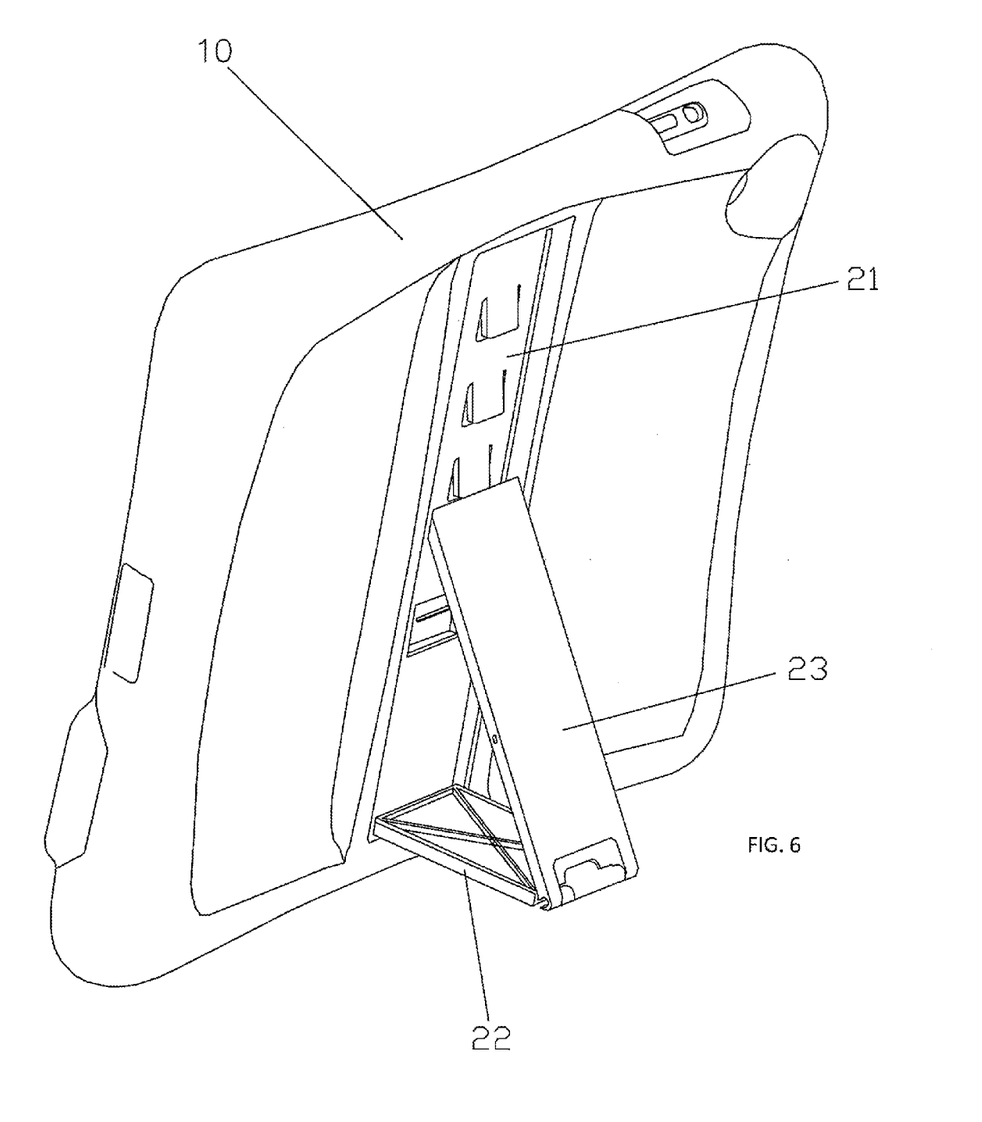
FIG. 6 is a rear perspective view of the protective sleeve with the bracket in an open position; and, FIG. 7 is a front perspective view of the protective sleeve.
Figure 7:
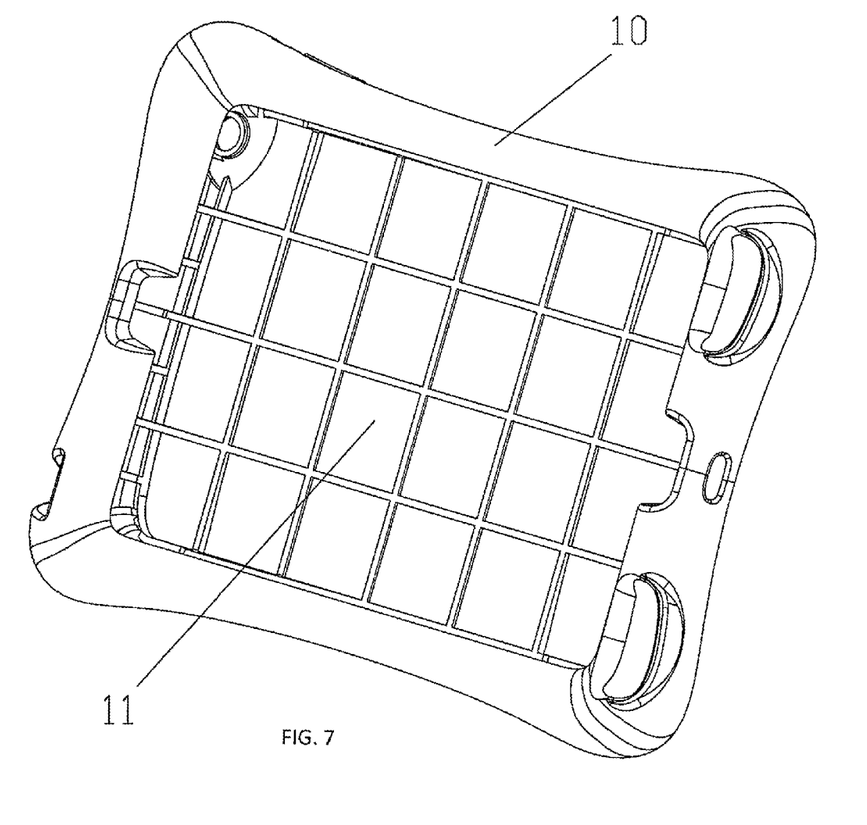

A shown in FIGS. 1 and 2, when bracket mechanism 20 is closed, cushion member 22 and a support member 23 are located in containing space 213 of fixed member 21. Bracket mechanism 20 is manually engaged by pulling extension groove 224 to provide support to protective sleeve body 10. In the open supporting position, cushion member 22 and a support member 23 are no longer contained within fixed member 21. Support pivot columns 233 on the upper portion of support member 23 slide along track grooves 215, thereby extending support member 23 outward from fixed member 21. Support member 23 continues to slide until the support member abuts the upper end of locking part 218, leaving support 23 at an angle relative to fixed member 21. Cushion member 22 also extends outwards since cushion pivoting columns 223 pivot in pivoting groove 216 and the cushion member is fixedly connected to support member 23. When support member 23 locks into place on locking part 218, cushion member 22 supports the protection sleeve body when it is positioned at an angle. This allows the user to watch or use, as shown in FIG. 6, the digital product at various angles depending on which locking part 218 that support member 23 is locked into. FIG. 7 illustrates the front portion of the protective sleeve that contains the digital product.

To sum up, the present invention has the advantages of supporting digital products in a protective sleeve when in use. Cushion member 22 and support member 23 can be placed in fixed member 21, which is convenient for users to carry and store. To open bracket mechanism 20, cushion member 22 and support member 23 are extended outward from fixed member 21. The lower portion of support member 23 slides within fixed member 21, until support member 23 locks into place on locking part 218. This allows the digital product to be positioned at an angle so users can conveniently watch and operate the digital product.

The technical personnel in the field, according to the technical scheme described above and conception, make other kinds of corresponding change and deformation, and all these changes and deformation should belong to the scope of protection of the utility model claims As used herein, the term protective sleeve can mean any type of case or container to cover a digital product.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A protective case with a bracket mechanism for digital products, comprising:
   a protective sleeve body;
   a fixed member arranged on a bracket mechanism on the back face of the protective sleeve body;
   the bracket mechanism comprises the fixed member, a cushion member and a support member, wherein:
      the fixed member is fixedly connected on the back face of the protective sleeve body, and,
      the fixed member includes a plurality of locking parts;
   the bottom of the cushion member pivots in a pivoting groove at the bottom of the fixed member;
   the bottom of the support member pivots about the upper portion of the cushion member, which is arranged on the fixed member;
   the cushion member and the support member are arranged within the fixed member when the bracket mechanism closes; and,
   to open the bracket mechanism, the bottom portion of the cushion member extends outward by pivoting about the pivoting grove of the fixed member, and the upper portion of the support member pivots and slides about track grooves in the fixed member, wherein the upper portion of the support member is securely locked into one of a plurality of locking parts.

2. The protective case with a bracket mechanism for digital products as recited in claim 1, wherein:
   the fixed member is flush against the protective sleeve body;
   the fixed member comprises a side wall and a containing space; wherein:
      the inner side of the lower portion of the side wall contains at least one pivoting groove;
      the cushion member has an extension portion that extends upward from the upper end of the cushion member;
      cushion pivot columns protrude from both sides of the extension portion of the cushion member;
      the upper portion of the cushion member and the extension portion having a chamfered profile; and,
      pivoting grooves on both sides of the lower portion of the cushion member which pivot about the pivoting groove.

3. The protective case with a bracket mechanism for digital products as recited in claim 2, further comprising:
   track grooves on the inner portion of the side walls on the upper portion of the fixed member;
   the support member having a panel board and a lower portion extending downward to form a pivoting arm, wherein the ends of the pivoting arm have a chamfered profile;
   support pivot columns protrude from the sides of the upper portion of the support member, which slidably engage in the track grooves; and,
   pivot holes of the pivoting arm connect to the cushion pivot columns of the extension portion, wherein the support member and the cushion member pivot about the cushion pivot columns connection.

4. The protective case with a bracket mechanism for digital products as recited in claim 2, wherein:
   the upper portion of the fixed member includes a plurality of longitudinally arranged windows;
   the locking part extends at an incline from an edge of the window; and,
   the locking part extends into the containing space.

5. The protective case with a bracket mechanism for digital products as recited in claim 1, wherein:
   the protective sleeve body includes an accommodating groove to hold digital products;
   the inside face of the protective sleeve body includes a plurality of containing grooves; and,
   the fixed member is fixedly connected to the outside face of the protective sleeve body, the same rear portion where the containing grooves are on the inside face.

\* \* \* \* \*